United States Patent Office 3,440,983
Patented Apr. 29, 1969

3,440,983
REED DENTS AND KNIFE MOUNTING MEANS ON A TUFTING MACHINE
Douglas George Woodcock, Burnley, England, assignor to Edgar Pickering (Blackburn) Limited, Blackburn, Lancashire, England, a British company
Filed Aug. 11, 1966, Ser. No. 571,901
Int. Cl. D05c 15/14
U.S. Cl. 112—79                3 Claims

ABSTRACT OF THE DISCLOSURE

A tufting machine for making cut pile fabric having a reed plate over which cloth is fed. The reed plate is provided with alternate pairs of short and long reed dents, cooperating respectively with front and rear rows of needles which are reciprocated through the cloth to form loops of yarn. The loops are held by front and rear loopers and knives cooperating with the respective loopers are mounted in different angular positions on a common oscillating shaft.

---

The invention provides a novel cut pile fabric, comprising a base cloth having lines of stiches on one surface which alternate with cut loops projecting from the other surface of the base cloth, the lines of stitches extending generally in the lengthwise direction of the base cloth with adjacent lines alternately approaching and separating to form a regular geometrical pattern. In a typical case adjacent lines of stitches alternately meet and separate to form a diamond pattern.

The invention includes a tufting machine, for use in making such a fabric, comprising a reciprocating needle bar carrying two rows of needles, the needles in one row being staggered in relation to those in the other row, means for feeding the cloth past the needles and also for imparting lateral reciprocating movement to the cloth as it passes the needles, loopers for engaging the loops of yarn formed by the needles as they pass through the cloth and slitting knives for cutting the loops of yarn held on the loopers.

Figure 1:
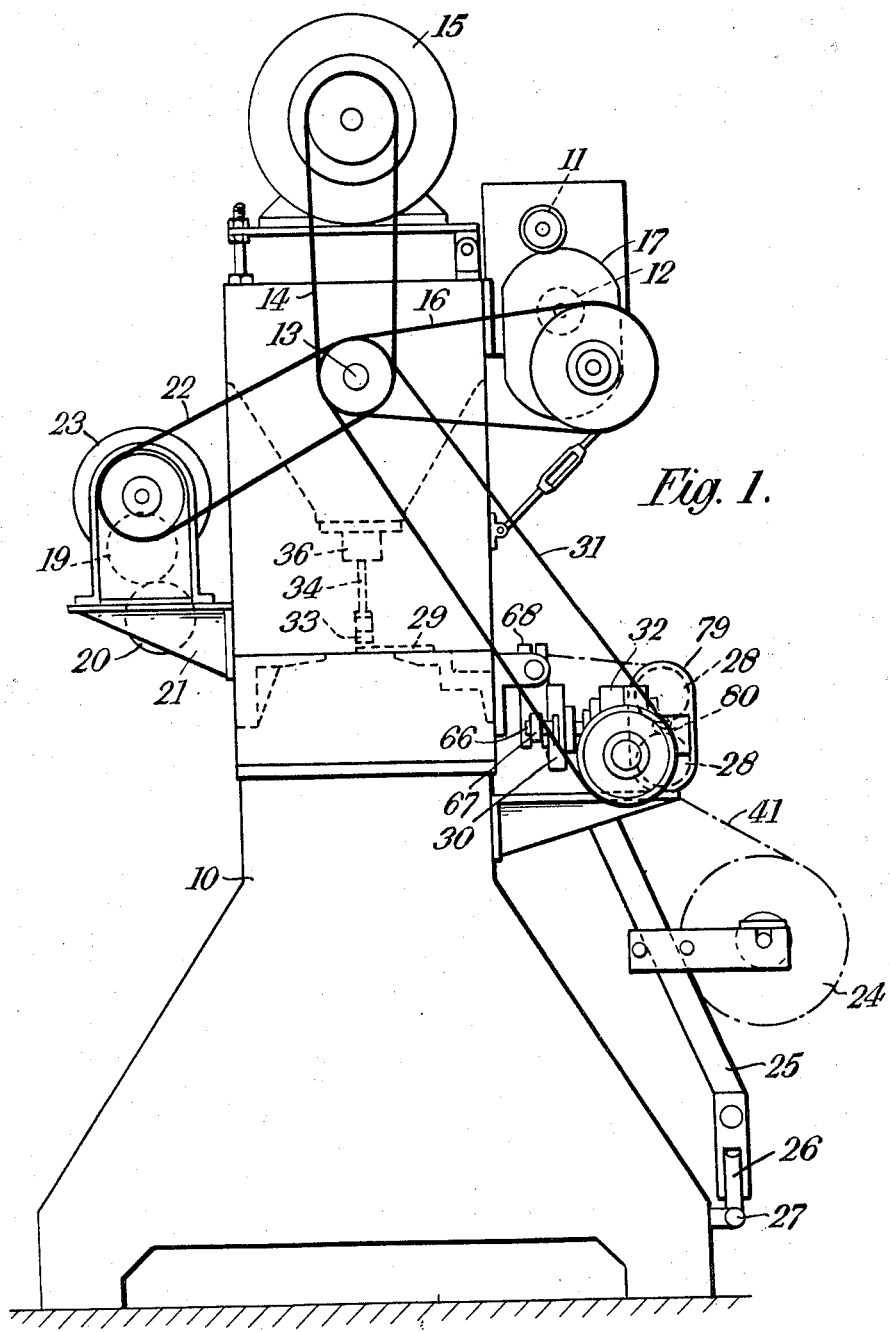
Figure 2:
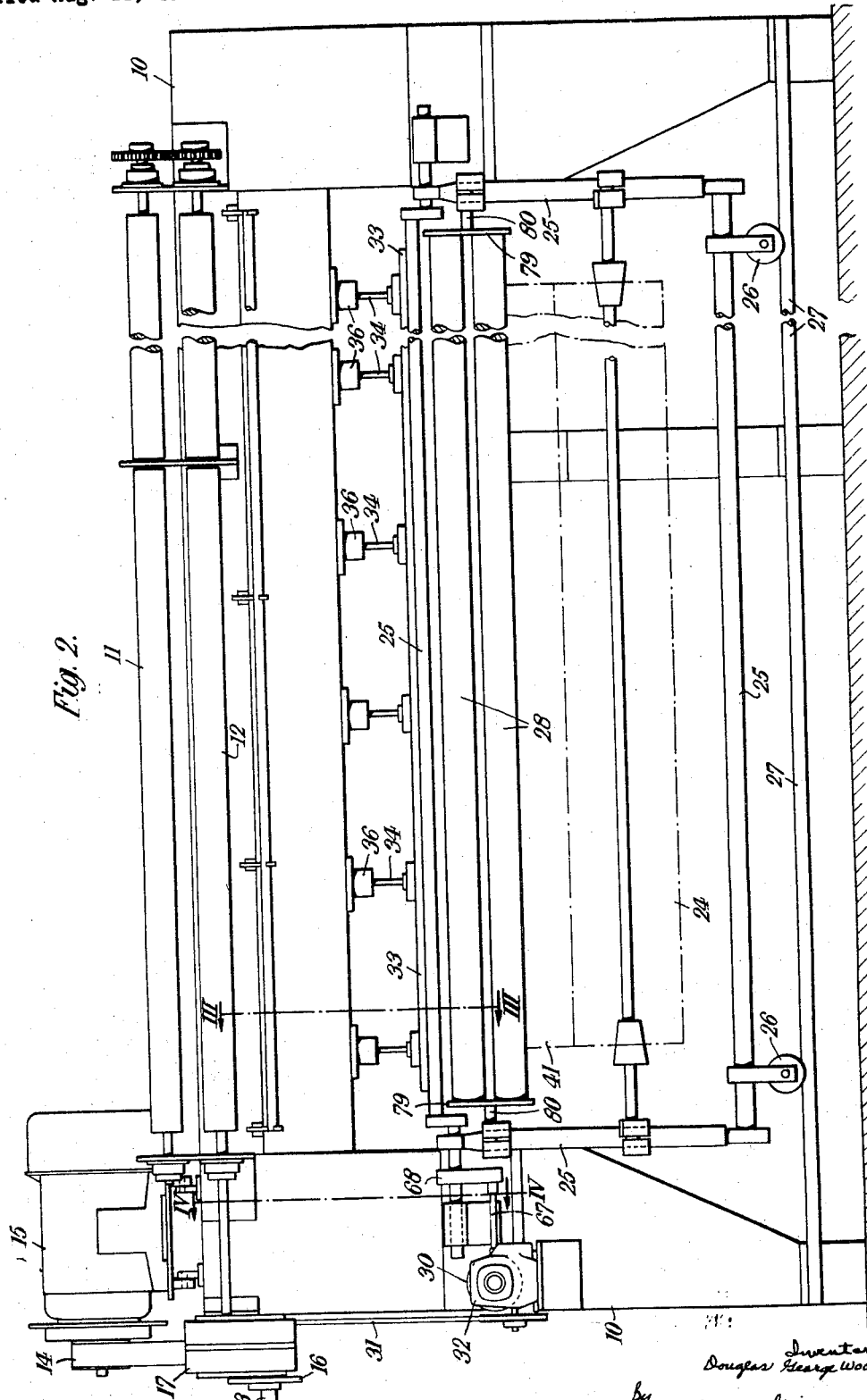
Figure 3:
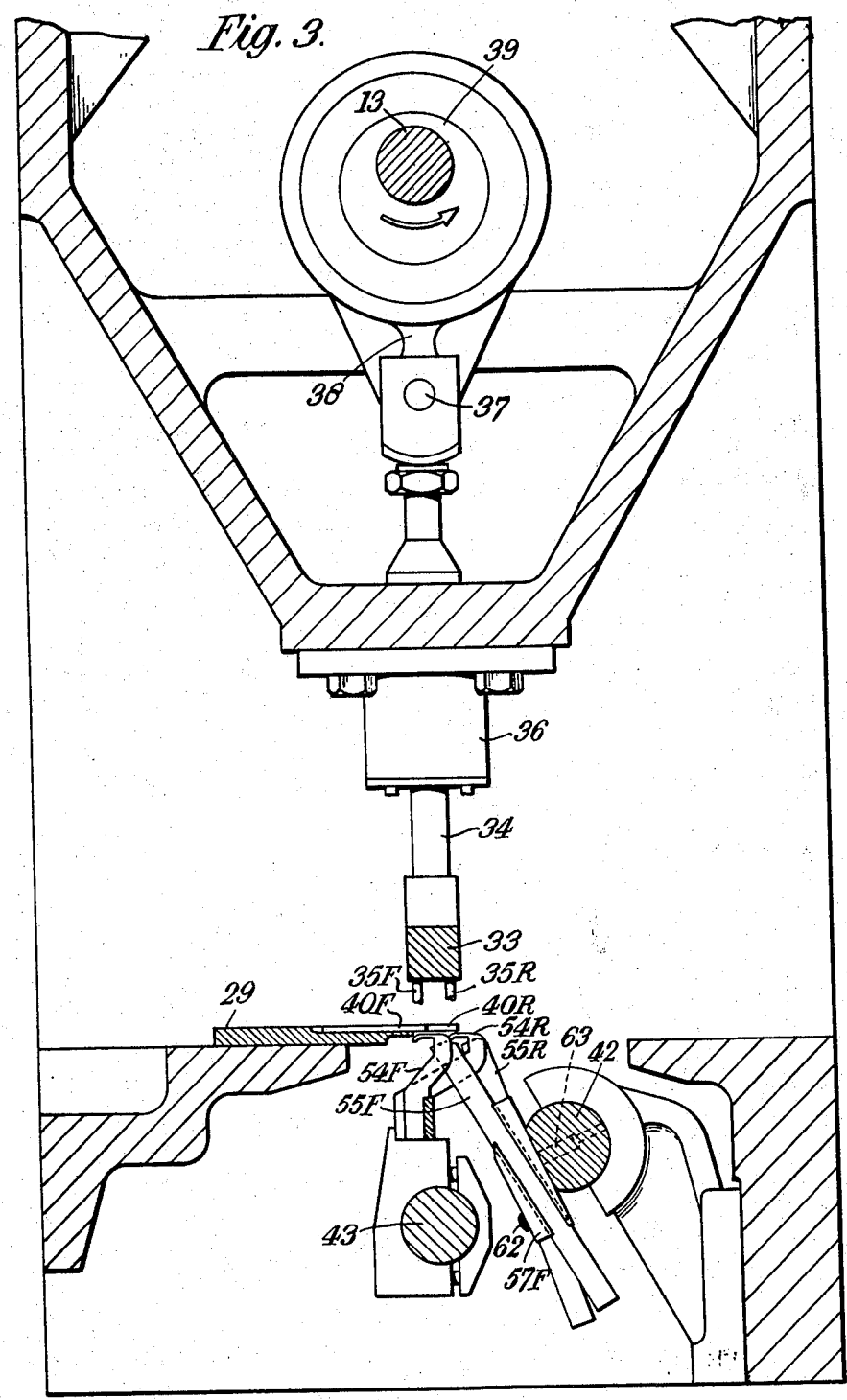
Figure 4:
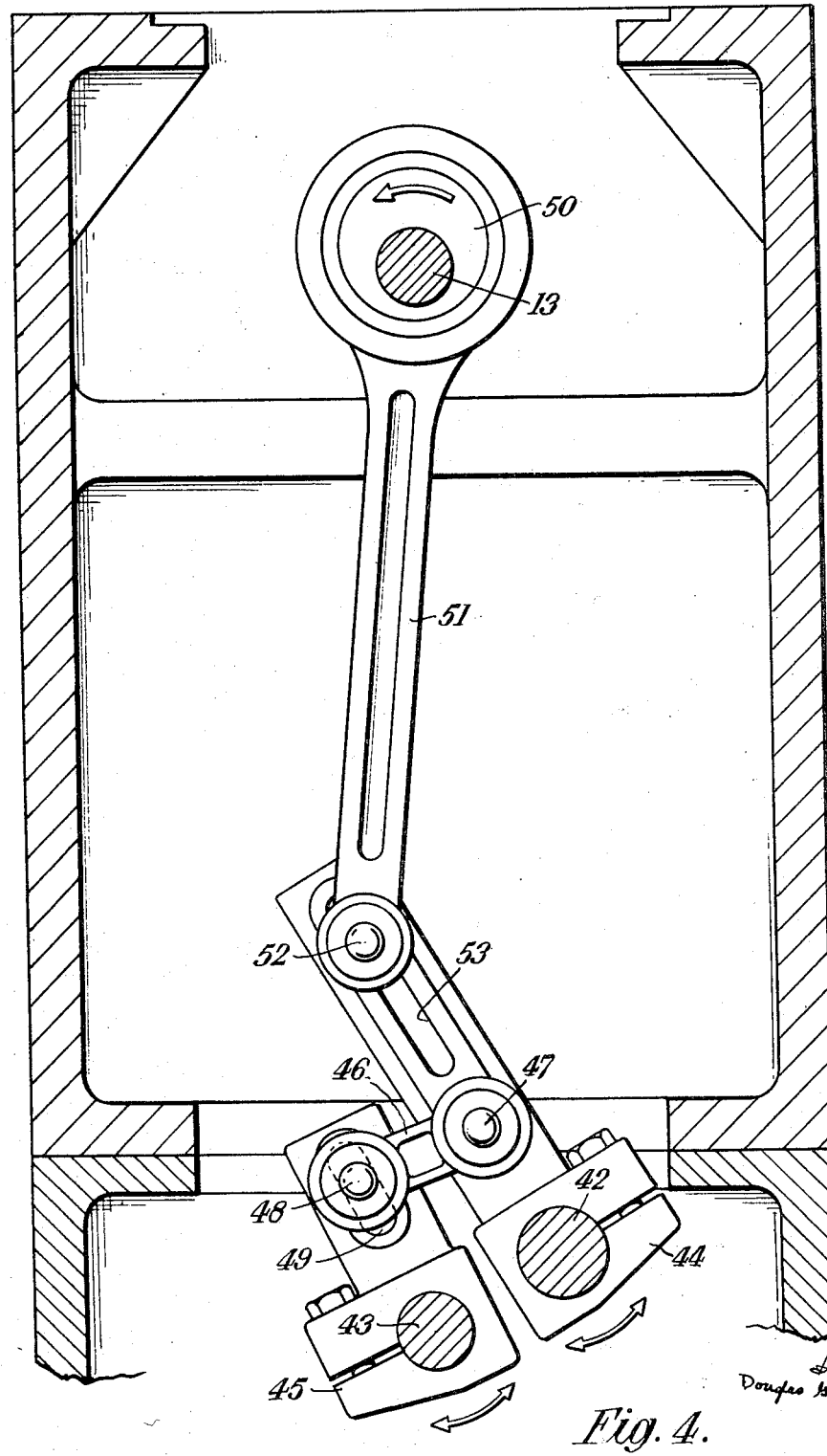
Figure 5:
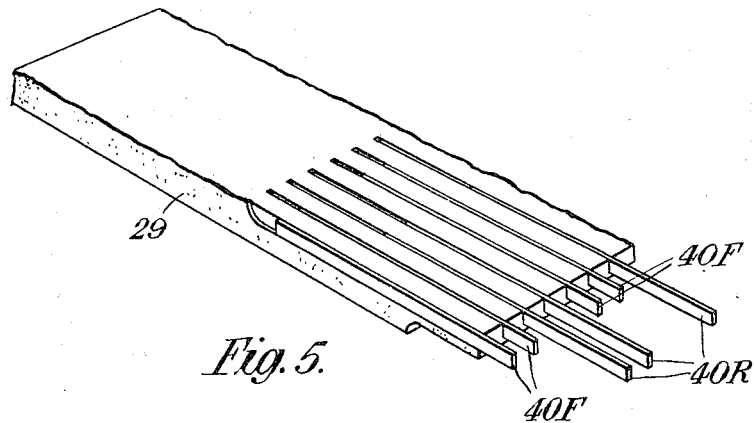
Figure 7:
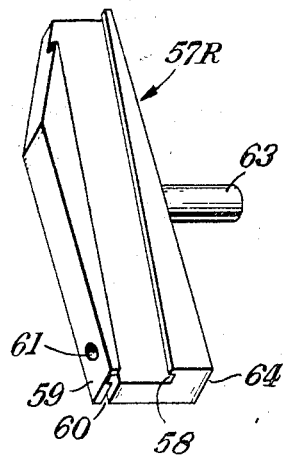
Figure 8:
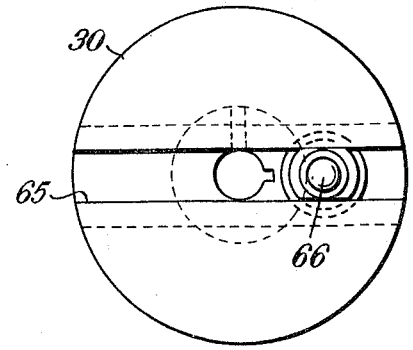
Figure 9:
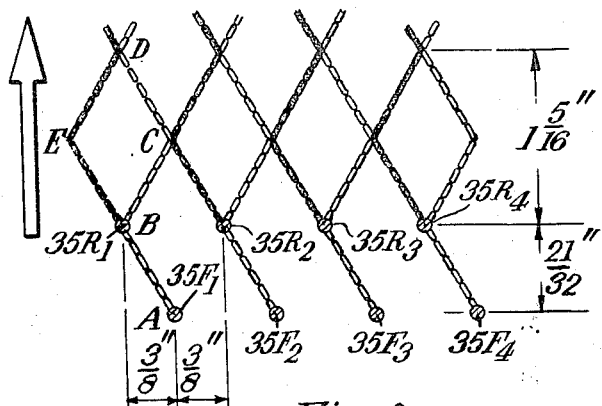
Figure 6A:
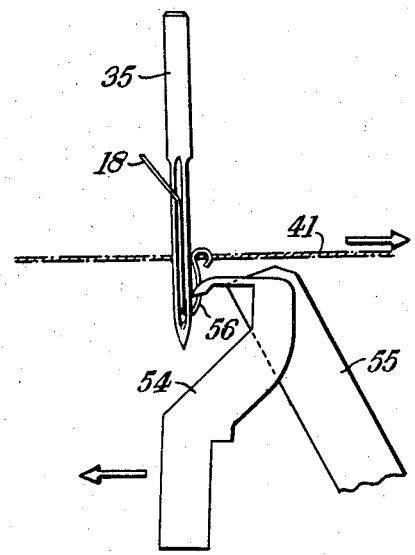

One embodiment of tufting machine according to the invention will now be described in detail, by way of example, with reference to the accompanying drawings, in which:

FIG. 1 is a side elevation of the machine,
FIG. 2 is a front elvation looking from the right hand side of FIG. 1,
FIG. 3 is a section on a larger scale on the line III—III in FIG. 2,
FIG. 4 is a section on a larger scale on the line IV—IV in FIG. 2,
FIG. 5 is a detail view of part of the reed plate,
FIGS. 6A, B and C are diagrams illustrating the action of the loopers and knives,
FIG. 7 is a perspective view of one of the knife blocks,
FIG. 8 is a view showing the cam for imparting transverse reciprocating movement to the cloth, and
FIG. 9 is a diagram showing the stitches formed in the cloth.

Like reference numerals indicate like parts throughout the figures.

As shown in FIGS. 1 and 2, the machine includes a pair of side frame 10 which support a pair of yarn feed rollers 11, 12 and a main drive shaft 13 which is driven by a belt drive 14 from a driving motor 15. The rollers 11, 12 are driven from the shaft 13 through a belt drive 16 and a gear box 17 and serve to feed yarns 18 to the individual needles of the machine from a creel or other suitable source, not shown. Two cloth feed rolls 19, 20 mounted on a bracket 21 are driven from the shaft 13 through a belt drive 22 and a gear box 23. The upper roll 19 is rubber covered and the lower roll 20 is spiked. The rolls 19, 20 draw cloth 41 continuously through the machine from a roll of cloth 24 mounted in a carriage 25 supported by rollers 26 on a rail 27 so that the carriage may be reciprocated transversely of the machine as later described. The cloth drawn from the roll 24 passes over tensioning rollers 28 and thence over a fixed horizontal reed plate 29 (FIG. 3) to the feed rolls 19, 20. The tensioning rollers 28 are supported in brackets 79 having trunnions 80 journalled in the carriage 25. By rocking the brackets 79 in relation to the carriage 25 and locking them in adjusted position the tension imposed on the cloth by the tensioning rollers 28 can be adjusted. A cam 30 for imparting transverse reciprocation to the carriage 25 and tensioning rollers 28 is driven from the shaft 13 through a belt drive 31 and a gear box 32.

A needle bar 33 (FIGS. 2 and 3) extends horizontally across the machine and is supported by a series of spaced push rods 34 which are slidably mounted in bearing sleeves 36. Each push rod is pivoted by a pin 37 to a connecting rod 38 embracing an eccentric 39 on the shaft 13. Accordingly the needle bar 33 receives a vertical reciprocating movement from the shaft 13.

The needle bar 33 carries two rows of needles, namely a row of front needles 35F and a row of rear needles 35R. The needles of each row are equally spaced at a pitch of ¾", each rear needle 35R being situated midway between a pair of front needles, and the spacing between the two rows of needles is 21/32". As shown most clearly in FIG. 5, the reed plate carries pairs of short reed dents 40F which support the cloth beneath the front needles 35F and between which the front needles 35F descend, which alternate with pairs of longer reed dents 40R which cooperate in similar fashion with the rear needles 35R.

The end frames 10 also support a knife shaft 42 and a looper shaft 43 which are rocked to and fro by the shaft 13 by the mechanism shown in FIG. 4. At each end the shafts 42, 43 carry brackets 44, 45 respectively which are coupled together by adjustable links 46. Each link 46 is pivoted to its bracket 44 by a pin 47 and is connected to its bracket 45 by a pin 48 which is adjustable in a slot 49 in the bracket 45. The shafts 42, 43 are actuated by eccentrics 50 on the shaft 13 through the agency of connecting rods 51. Each connecting rod 51 is adjustably connected to one of the brackets 44 by a pin 52 engaging a slot 53 in the bracket.

Figure 6B:
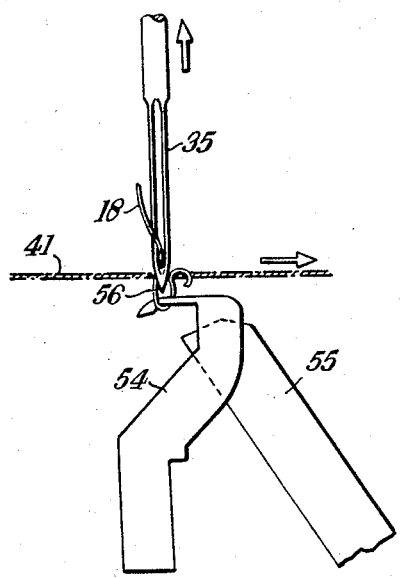
Figure 6C:
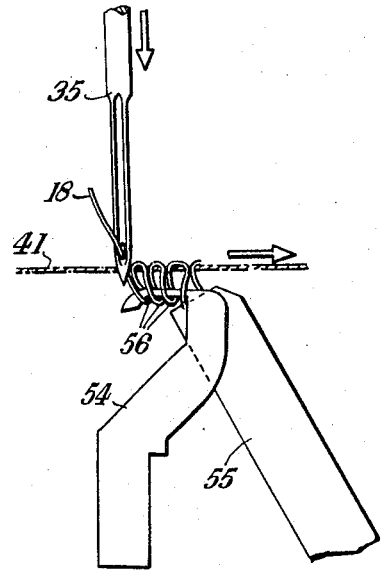

The shaft 43 (see FIG. 3) carries alternating short and longer loopers 54F, 54R which cooperate respectively with the front and rear needles 35F, 35R. The shaft 42 carries knives 55F, 55R which extend alternately at different angles from the shaft 42 and cooperate respectively with the loopers 54F, 54R. The action of the front and rear loopers and knives is the same and is shown in FIGS. 6A–6C. FIG. 6A shows a needle 35 at the bottom of its stroke, having passed through the cloth 41 and formed a loop 56. As shown in FIG. 6B, the looper 54 advances to retain the loop 56 as the needle 35 rises. As loops are formed on the looper 54 they are gradually pushed towards the bight of its hook. Only after four loops have been picked up by a looper has the loop first picked up been pushed along the looper far enough to reach the path of the knife 55 and accordingly been cut by the knife as shown in FIG. 6C.

The knives 55F, 55R are respectively mounted in knife blocks 57F, 57R (see FIGS. 3 and 7). Each knife block has in its side an undercut groove 58 to receive a knife and has at one end a lip portion 59 separated by a slot 60 from the main body and formed with a hole 61 for the reception of a clamping screw 62 (FIG. 3) for holding a knife in position in the groove 58. Each knife block has a spigot 63 projecting at right angles from its base surface 64 and the spigots 63 of all knife blocks are accommodated in parallel radial holes in the knife shaft 42 as shown in FIG. 3. The knife blocks 57F and 57R are identical except that their grooves 58 are inclined at different angles to their base surfaces 64 so that the tips of the knives carried by them are brought into proper cooperation with the front and rear loopers 54F, 54R as the case may be.

As shown in FIG. 8, the cam 30 for imparting transverse reciprocating movement to the carriage 25 is formed with a slot 65 accommodating a cam stud 66. The cam stud is connected by a connecting rod 67 (FIGS. 1 and 2) to a bracket 68 on the carriage. The amplitude of the reciprocating movement imparted to the carriage can be varied by altering the distance between the cam stud 66 and the centre of the cam 30.

FIG. 9 is a diagram showing the lines of stitches formed in the top surface of the cloth. As will be seen these lines extend generally in the longitudinal direction of the cloth, which is understood to be travelling in the direction of the arrow. Alternate lines of stitches alternatively meet and separate in a diamond pattern and it will be understood that the stitches in each line alternate with cut loops projecting from the bottom surface of the cloth. The line of stitches ABCD is that formed by the front needle $35F_1$, and the line of stitches BED is that formed by the rear needle $35F_1$, lines of stitches extending similarly are formed by the other front and rear needles shown, i.e., $35F_2$–$F_4$ and $35R_2$–$R_4$.

In the particular example shown in FIG. 9 the spacing of the needles on the needle bar is that already stated, i.e., ¾" between needles in each row and $2\frac{1}{32}$" between rows. The lateral throw of the cloth at the needles is ⅜" and the forward feed of the cloth per pattern repeat is $1\frac{5}{16}$". To achieve a lateral throw of the cloth at the needles of ⅜", the carriage 25 is given a lateral reciprocation of ⅞", the amount of lateral reciprocation of the carriage depending, of course, on the distances between the carriage and the needles and between the needles and the feed rolls 19, 20. In a typical case, the machine may accommodate some 600 ends of yarn and form 14 stitches per inch length of cloth.

The cam 30 imparts a simple harmonic motion to the carriage which results in the diamond pattern shown in FIG. 9, the dimension EC in the pattern being capable of variation by adjusting the position of the cam stud 66 (FIG. 8) in the cam 30. Other variations in the diamond pattern may be achieved by varying the relative positions of the needles on the needle bar. By using cams of other configuration the carriage may be given a reciprocating motion which is not a simple harmonic motion, to produce other patterns all of which, however, have the characteristic of lines of stitches which alternately approach and separate from one another. Thus the lines of stitches may extend in elliptical paths between meeting points.

What I claim as my invention and desire to secure by Letters Patent is:

1. A tufting machine for making cut pile fabric, comprising a fixed horidontal reed plate having pairs of short reed dents which alternate with pairs of long reed dents, means for feeding cloth over the reed plate in a direction parallel to the reed dents, means for imparting lateral reciprocating movement to the cloth as it passes over the reed plate, a needle bar carrying two rows of needles, each needle in one row being positioned above a pair of short reed dents and each needle in the other row being positioned above a pair of long reed dents, means for feeding yarn to the needles, means for reciprocating the needle bar to cause the needles to travel downwardly between the reed dents to form loops of yarn as they pass through the cloth, loopers for engaging the loops of yarn, and slitting knives for cutting the loops of yarn held on the loopers.

2. A tufting machine for making cut pile fabric, comprising a reciprocating needle bar carrying a front row and a rear row of downwardly extending needles, the needles in the front row being staggered relatively to those in the rear row, means for feeding cloth beneath the needle bar, means for feeding yarn to the needles, means for reciprocating the needle bar to cause the needles to penetrate the cloth to form loops of yarn, loopers for engaging the loops of yarn, knife blocks mounted on a common shaft, all of said knife blocks having spigots accommodated in parallel radial holes in the shaft and alternate knife blocks having oppositely angled grooves, knives accommodated in said grooves and extending alternately toward loops formed by the front row of needles and toward loops formed by the rear row of needles, and means for cocking the shaft to cause the knives to cut the loops.

3. A tufting machine as claimed in claim 2, which includes means for imparting lateral reciprocation to the cloth as it passes beneath the needle bar.

References Cited
UNITED STATES PATENTS

| | | | |
|---|---|---|---|
| 2,679,218 | 5/1954 | Jones | 112—79 |
| 3,084,644 | 4/1963 | Card | 112—79 |

JAMES R. BOLER, *Primary Examiner.*